United States Patent [19]
Chadwick

[11] Patent Number: 5,256,354
[45] Date of Patent: Oct. 26, 1993

[54] METHOD FOR FORMING AN INVISIBLE TEAR SEAM

[75] Inventor: Neil Chadwick, St. Clair Beach, Canada

[73] Assignee: Davidson Textron Inc., Dover, N.H.

[21] Appl. No.: 974,703

[22] Filed: Nov. 12, 1992

[51] Int. Cl.$^5$ ............................................. B29C 39/02
[52] U.S. Cl. ..................... 264/119; 264/126; 264/302; 264/DIG. 60; 280/732
[58] Field of Search ....... 264/119, 126, 302, DIG. 60; 280/732

[56] References Cited
U.S. PATENT DOCUMENTS

| | | | |
|---|---|---|---|
| 4,217,325 | 8/1980 | Colby | 264/245 |
| 4,246,213 | 1/1981 | Takamatsu et al. | 264/46.7 |
| 4,562,025 | 12/1985 | Gray | 264/126 |
| 4,665,864 | 5/1987 | Wersosky | 264/301 |
| 4,755,333 | 7/1988 | Gray | 264/37 |
| 4,895,389 | 1/1990 | Pack, Jr. | 280/732 |
| 4,923,657 | 5/1990 | Gembinski et al. | 264/73 |
| 4,979,888 | 12/1990 | Bauer et al. | 425/174.4 |
| 5,082,310 | 1/1992 | Bauer | 280/732 |

Primary Examiner—Mary Lynn Theisen
Attorney, Agent, or Firm—Reising, Ethington, Barnard, Perry & Milton

[57] ABSTRACT

A method for forming a hidden tear seam in the cover for a safety air bag assembly comprises the steps of filling a heated open mold with liquid plastisol or dry powder comprised of polyvinyl materials; forming a gel layer of polyvinyl chloride material on the open heated thin metal mold; dumping excess polyvinyl liquid plastisol chloride material from the gel layer; fusing the gel layer; stamping a tear seam in a fused layer while it is still plastic by providing an anvil having a surface thereon of a first predetermined area and including an embossment thereon extending outwardly of said first predetermined area and stamping the tear seam by directing the embossment into the fused layer until the surface engages the fused layer and wherein the first predetermined area is sized to produce a reaction force on the anvil to determine the depth of penetration of the embossment and thereafter finally curing and cooling the fused layer and removing same from said thin metal mold.

8 Claims, 3 Drawing Sheets

METHOD FOR FORMING AN INVISIBLE TEAR SEAM

FIELD OF THE INVENTION

This invention relates to covers for safety air bag assemblies and more particularly to a method for forming hidden seam lines in covers for safety air bag assemblies.

BACKGROUND OF THE INVENTION

One method for forming hidden seam lines in covers for safety air bag assemblies include molding a shaped seam in a skin or cover molded from thermoplastic materials such as copolyether ester elastomers; polycarbonates; polyolefins; thermoplastic polyolefin alloys; polyurethanes; polyamides; polyacetals; thermoplastic polyester elastomers; polybutyleneterephthalate; polyethyleneterephthalate; acrylonitrile/butylene/styrene polymers and polystyrene. Examples of such molding processes are set forth in U.S. Pat. Nos. 4,246,213 and 4,895,389 issued respectively on Jan. 20, 1981 and Jan. 23, 1990 to Takmatsu et al and to Wesley D. Pack, Jr.

Another method for forming hidden tear seam lines in such covers is to use a knife to cut a groove in the inside surface of the cover to a depth the will produce a weakened section that will assure that the cover will separate upon deployment of the air bag against the inner surface of a door assembly that underlies the hidden tear seam in the cover as set forth in U.S. Pat. No. 5,082,310 issued Jan. 21, 1992 to Bauer.

While suitable for their intended purpose such methods are not useful in processes in which the cover is formed by casting an excess charge of thermoplastic resin on a heated thin metal shell mold to form a fused layer of the resin on the surface following which the excess amount of material is dumped from the heated thin metal shell mold leaving only the fused layer in place thereon. Examples of such processes are set forth in U.S. Pat. Nos. 4,217,325 and 4,664,864 both of which are owned by the assignee of the present invention and both of which are incorporated by reference.

The '325 and '864 patents do not disclose a process in which the deposited layer of material is imprinted in of the molded material while it is still plastic after all the excess material is dumped from the heated mold and while the mold is still open to expose the deposited layer of curing thermoplastic material.

SUMMARY OF THE INVENTION

The present invention provides a method for forming a hidden tear seam in a cover for a safety air bag assembly by a method that enables a powder or slurry of thermoplastic material to be distributed from a larger source of material to fill or substantially fill a thin metal mold that is preheated. The fill material is partially fused as a layer of material on the thin metal mold during a dump gel cycle and then excess material is dumped from the open heated mold and the heated mold remains open so that the layer of thermoplastic material is exposed for access from the exterior of the heated mold. Thereafter, the layer of material is fused during a fuse cycle to form a layer of fused material having a plastic state capable of maintaining a self-supporting impression. An anvil is provided on the mold apparatus having an embossment thereon corresponding to the desired shape of the hidden tear seam. The embossment is surrounded by a surface region having a predetermined area that will upon contact with the fused/plastic layer be subjected to a reaction force that will limit penetration of the embossment into the layer of material. The anvil is directed against the outer surface of the fused layer while it is in its self-supporting plastic state. The anvil is pressed against the surface of the fused/plastic layer of thermoplastic material to stamp the shape of the embossment into the curing layer of the thermoplastic material while it remains plastic so as to form a precision tear seam configuration such as a C, U or X pattern of the type shown in U.S. Pat. application Ser. No. 07/680,837 filed Apr. 5, 1991, now U.S. Pat. No. 5,154,444 and commonly assigned to the assignee hereof. The depth of the tear seam is precisely controlled by the use of gauge blocks on a press cylinder that is coupled in driving relationship to a shaft connected to the anvil. The embossment on the anvil can be a steel rule die, either heated or unheated and including provision for adjusting the height of the steel rule die elements to adjust the depth of the impression imparted into the layer of thermoplastic material. A part of the anvil surrounding the embossment bears on the plastic material and has an area that is preselected to react against the deposited thermoplastic material for controlling the depth of the impression so that a resultant tear seam pattern will not be visually observable from the outer surface of the cover in which the tear seam pattern is formed. Following imprinting, the layer is fused to a non-plastic state, cooled and removed from the mold.

Additional features of the present invention are described in relation to the preferred embodiment when taken in conjunction with the following drawings.

DESCRIPTION OF THE PREFERRED EMBODIMENT

Figure 1:
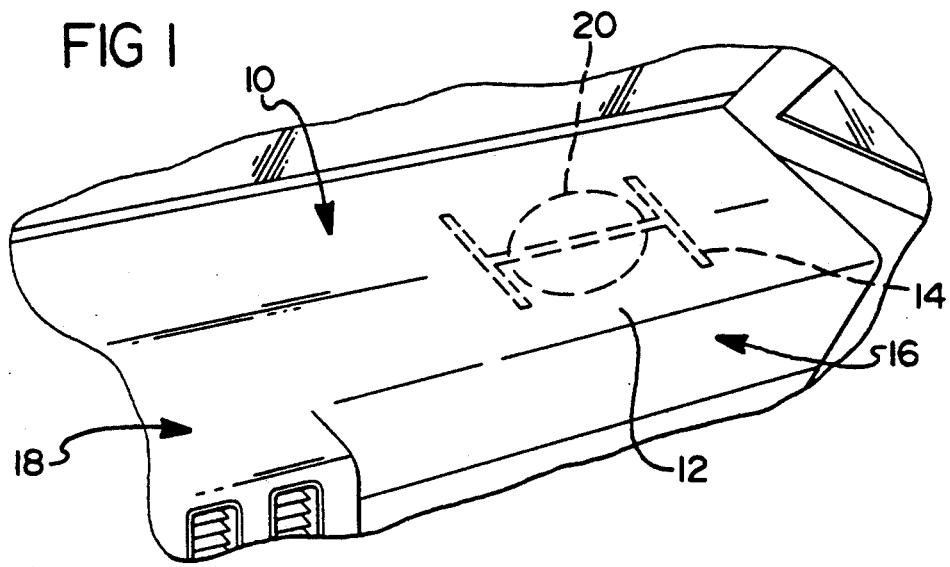
FIG. 1 is a perspective view of an instrument panel including a cover for a safety air bag assembly with a hidden tear seam therein manufactured by the method of the present invention.
Figure 2:
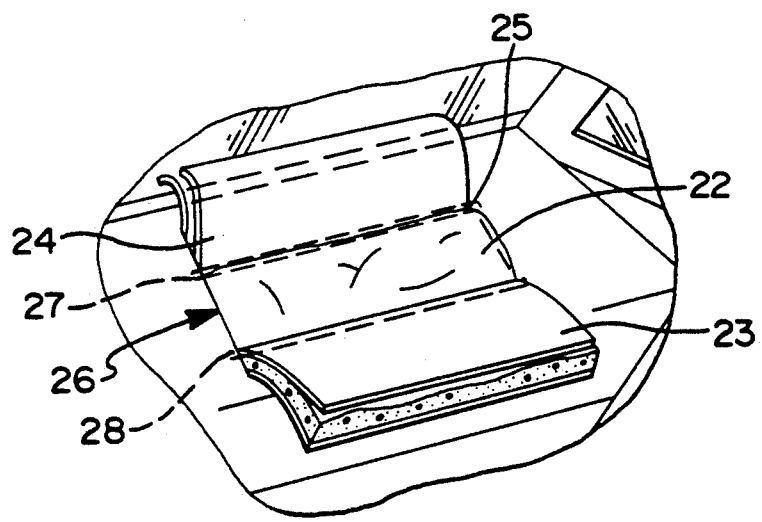
FIG. 2 is a perspective view of an air bag deployed through the instrument panel of FIG. 1.

Referring now to FIG. 1, a passenger compartment of a motor vehicle is shown generally by reference numeral 10. The product of the present invention is a cover 12 of thermoplastic material such as polyvinyl chloride resin material (PVC) formed by a cast molding method of the present invention to have a hidden tear seam or groove 14 formed therein which is voidless and of a density so as not to be visible at the outer surface 16 of the cover 12 so as to interfere with the overall aesthetics of the cover 12. While polyvinyl chloride is a preferred material, other thermoplastic materials that will partially fuse as a layer on a heated mold prior to dumping excess material and thereafter cure on the heated mold are also suitable. Examples of such materials include copolyether ester elastomers; polycarbonates; polyolefins; thermoplastic polyolefin alloys; polyurethanes; polyamides; polyacetals; thermoplastic polyester elastomers; polybutyleneterephthalate; polyethyleneterephthalate; acrylonitrile/butylene/styrene polymers and polystyrene. In the illustrated arrangement, the cover 12 is formed as part of a foam molded instrument panel 18 in which is located an air bag restraint assembly 20.

In practicing the method of the present invention, the cover 12 is formed to be separated along the hidden tear groove 14 for deployment of an air bag 22 of the air bag restraint assembly 20 into the passenger compartment through two doors 23, 24 which are formed when the tear groove separates. When such separation is formed the doors are connected to an instrument panel insert 25 at hinges 27, 28 so as to swing upwardly and outwardly from one another of the vehicle so as to fully clear the air bag 22 being deployed through an opening 26.

Examples of suitable air bag restraint systems are shown in U.S. Pat. No. 5,072,967 issued Dec. 17, 1991, commonly assigned with the present application and incorporated herein by reference for purposes of showing a typical air bag restraint system in which an air bag 22 is inflated to impact the underside of the cover 12 to stress the tear groove 14 for separating to form the doors 23, 24 and a resultant opening 26 through which the air bag 22 is deployed in a known manner. While shown in association with an instrument panel interior trim product, the method of the present invention is equally suitable for use in the formation of air bag covers which are found on steering columns and in other interior trim products from which it is desirable to deploy an air bag in response to a vehicle impact of a magnitude which will cause such deployment. While the tear seam 14 preferably has a V-shaped configuration, other shapes can be formed by the method of the present invention including all H-shapes when the cover 12 is associated with a two door air bag assembly or a four door configuration as shown for example in U.S. Pat. No. 5,154,444, issued Oct. 13, 1992, and assigned to the assignee of this application.

Figure 3:
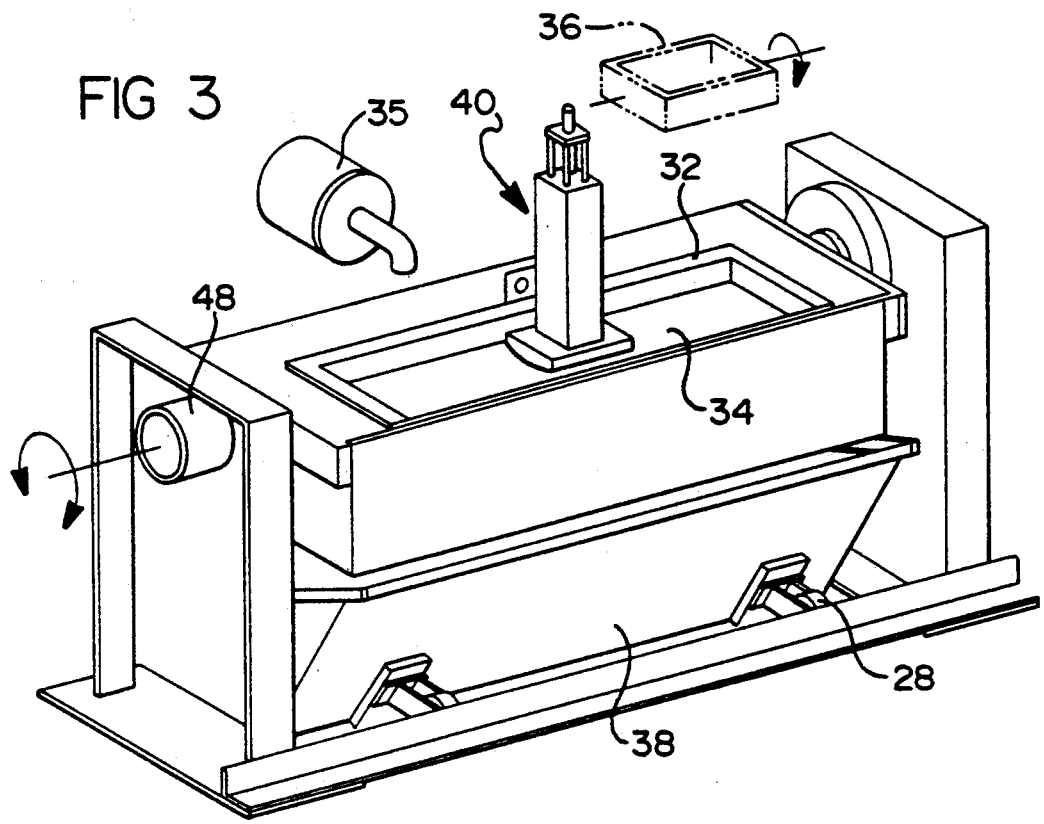
FIG. 3 is a perspective view of apparatus for practicing the method of the present invention.
Figure 5:
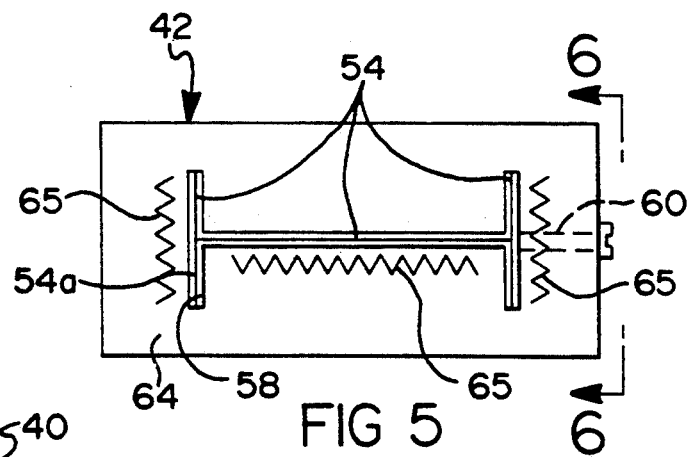
FIG. 5 is a view of the stamping device taken along the like 5—5 of FIG. 4 looking in the direction of the arrows.
Figure 4:
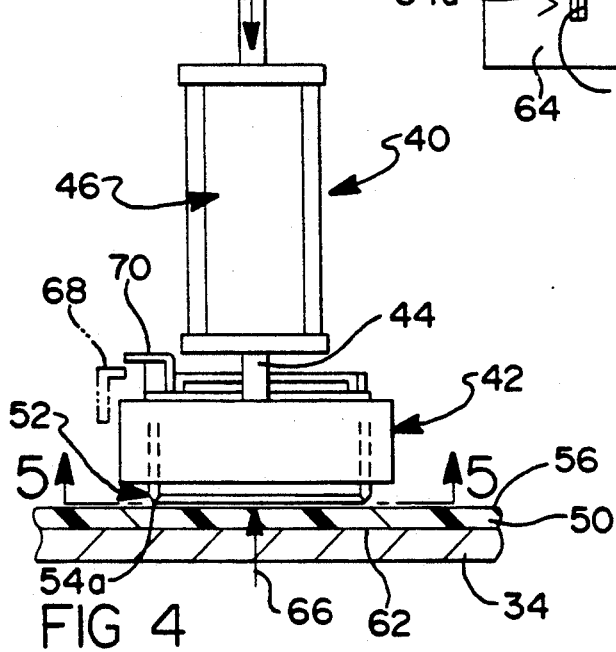
FIG. 4 is a front elevational view of a stamping device used in practicing the present invention.
Figure 6:
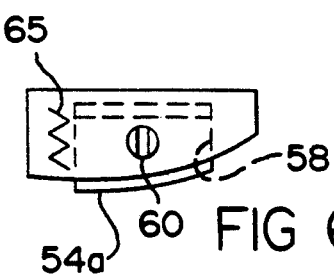
FIG. 6 is a fragmentary side elevational view taken along the line 6—6 of FIG. 6.

In each case, a V-shaped groove is formed through part of the depth of the cover 12 along the tear seam pattern whether it a C, H or X pattern. In the practice of the invention, mold apparatus 30 is used as shown in FIGS. 3-5. The apparatus includes a thin metal shell mold part 32 with a contoured inner surface 34 that defines the surface appearance of the resultant cover 12 including aesthetic features such as grain texture or other decorative formations. The inside surface of the cover 12 is hidden and is, accordingly, less finished.

The mold apparatus 10 includes a source of plastisol 35 as set forth in U.S. Pat. No. 4,217,325. In the '325 patent the plastisol is in liquid form. Alternatively, a source of thermoplastic material such as a powder box 36 that is adapted to carry dry particles of a suitable thermoplastic material such as polyvinyl chloride particles having a porous resin core of plasticizer saturated material of 250-350 micron diameter. The outer layer of the particles includes submicron particles in a dried liquid carrier and a color pigmentation color can be provided as a dye or stain in the outer layer. The outer surface also includes submicron particles of a suitable filler/dryer. The sources of thermoplastic material whether liquid or dry constitute an excess of material required to form a desired cover configuration on the thin metal shell mold part 32. The shell mold is heated. The liquid or powder particles are distributed against the inner surface 34 where they form a gel layer in the case of liquid plastisol. In the case of dry particles, the particles fuse together in a liquid phase to build up a layer of material having several particles partially fused together in a plastic state. The required time to build up a desired thickness shell or cover is dependent upon the temperature of the mold, the size of the particles and the thickness requirements.

Once the cover thickness is attained the shell mold 32 is emptied of excess material into a suitable receptacle such as a dump container 38 (FIG. 3).

In the case of liquid plastisol, as set-forth in U.S. Pat. No. 4,217,325, a heated shell mold is filled with the liquid plastisol having suspended particles of thermoplastic resin. The plastisol consists of a special plastisol-grade PVC resin (40-65%), plasticizer (phthalate, trimellitate, epoxidized soy oil) (25-50%), stabilizer, pigment, flow modifier, (5-15%). The plastisol is allowed to build on the shell mold until the desired shell thickness is reached and then the excess liquid plastisol having particles of suspended thermoplastic resin that fills the mold is dumped and returned to the source 35 of liquid plastisol in a known manner. In this case a gel layer of plastisol is built up on the heated mold. As in the case of a process in which dry particles are distributed onto the heated mold, the required fuse time to build up a desired thickness shell or cover is dependent upon the temperature of the mold, the percentage of the solids in the slurry and the thickness requirements of the finished part.

As shown in FIGS. 4 and 5, a stamping device 40 includes an anvil 42 connected by a shaft 44 to a power cylinder 46 operable to reciprocate the anvil 42 with respect to a curing layer 50 of plastisol. The anvil 42 includes an embossment 52 thereon, representatively shown as a plurality of steel rule die elements 54 that are shaped in accordance with a desired tear seam pattern to be formed in the exposed surface 56 of the fused layer 50. Each of the die elements 54 have a V-shaped tip 54a for stamping an impression in the fused layer of plastisol while it is still plastic. Each of the die elements are supported adjustably and a track 58 in the anvil 42 and a lock screw 60 is provided to hold each of the die elements 54 in a desired position such that the depth of the impression formed within the exposed surface 56 is accurately controlled at a depth beneath the exposed surface 56 of the gel or sintered layer 50 such that the impression produced by the die elements 54 are not visually observable when viewed in the direction of the surface 62 once the gel or sintered layer is stamped and then removed from the mold. Heaters 65 can be mounted on the anvil 42 to heat the die elements 54 to aid the stamping process. While the die elements 54 are referred to as steel rule dies, it should be understood that other materials are suitable for use in place of steel so long as the replacement has suitable wear properties, e.g., bronze copper, brass, nickel or aluminum.

Another aspect of the present invention is that the anvil 42 has a surface 64 thereon with an exposed area that will engage the exposed surface 56 and bear thereagainst so as to produce a reaction force 66 on the anvil 42 counter to the actuating pressure of the cylinder 46 such that the depth of penetration into the fused layer 50 can be controlled as a pressure dependent variable. Alternatively, the depth of penetration can be controlled by a limit switch 68 that is mounted with respect to the cylinder 46 and operative upon engagement with an adjustably mounted gauge block 70 on the piston 46a that connects to the shaft 40.

Figure 7:
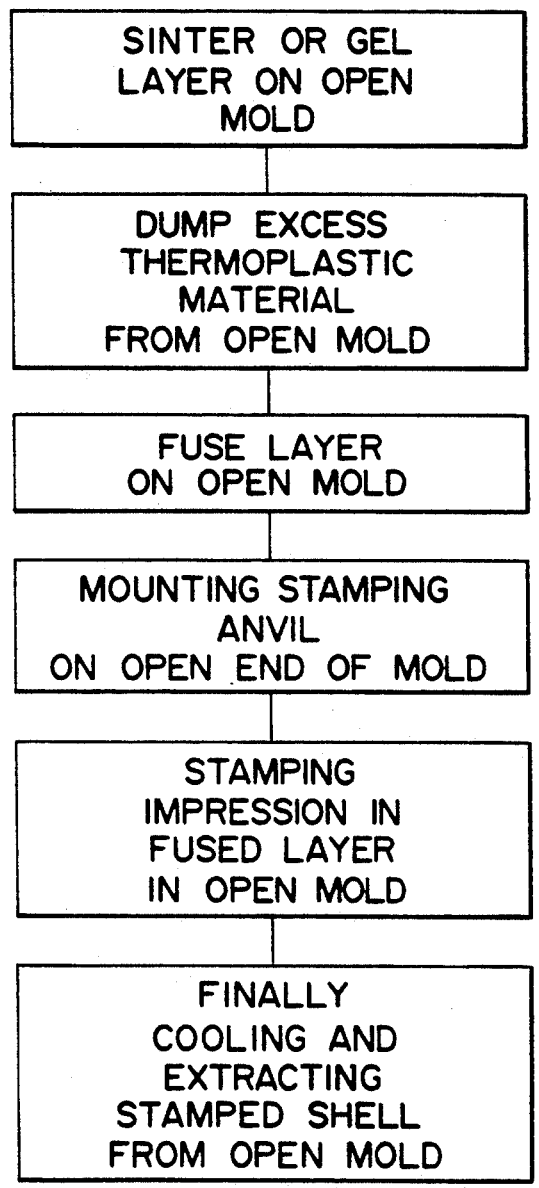
FIG. 7 is a chart showing the steps of the method of the present invention.

As diagrammed in FIG. 7, the method of the present invention includes the steps of 1. Sintering a layer of dry or gelling a layer of liquid thermoplastic material on a heated thin metal open mold;

2. Dumping material from the sintered or gelled layer;

3. Fusing the layer of thermoplastic material.

4. Providing a stamping anvil on an open end of the mold and stamping a tear seam in the fused layer from the open end and while the fused layer is still plastic. In the illustrated method, the stamping anvil is mounted on the open end of the mold.

5. Limiting the depth of the stamping anvil either by providing a limit stop on a drive for the stamping anvil or by providing a pressure responsive surface on the anvil with a predetermined area and including an embossment thereon extending outwardly of said predetermined area and stamping the tear seam by directing the embossment into the fused layer until the pressure responsive surface engages the fused layer and wherein the pressure responsive surface is sized to produce a reaction force on the anvil to determine the depth of penetration of the embossment.

6. Thereafter finally fusing the stamped layer to a non-plastic state.

7. Cooling the fused layer and removing same from the still open thin metal mold.

Representative gel temperatures and gel cycle times are 120° C. and 20 seconds for liquid material. Representative sintering temperatures and time are 120° C. and 20 seconds for dry material.

Representative fusion temperatures and times are 200° C and 30 seconds for liquid and dry material.

Representative temperatures and times for imprinting the plastic surface following gelation (sintering) are 200° C. and 15 seconds for liquid material and 200° C. and 15 seconds for dry material.

While polyvinyl chloride resin is a preferred material, other suitable materials can include copolyether ester elastomers; polycarbonates; polyolefins; thermoplastic polyolefin alloys; polyurethanes; polyamides; polyacetals; thermoplastic polyester elastomers; polybutyleneterephthalate; polyethyleneterephthalate; acrylonitrile/butylene/styrene polymers and polystyrene. In each case, the material is in a fused but plastic state before the embossment is impressed to form a desired tear seam pattern.

The invention has thus been shown and described with reference to specific embodiments, however, it should be noted that the invention is in no way limited to the details of the methods but changes and modifications may be made without departing from the scope of the appended claims.

What is claimed is:

1. A method for making a cover member for a safety air bag assembly including the steps of heating an open thin metal mold and casting thermoplastic material either as a dry powder or as a liquid slurry against the casting surface of the heated thin metal mold and sintering or gelling a layer of the thermoplastic material on the thin metal mold by directing an excess charge of the thermoplastic material thereon and dumping any unfused thermoplastic material from the heated mold characterized by the further steps of:

fusing the sintered or gelled layer of thermoplastic material to a plastic state capable of maintaining a self-supporting impression; and stamping a tear seam in the fused layer while the fused layer is still plastic and while the thin metal mold is still open and thereafter finally curing and cooling the fused layer and removing same from the open thin metal mold.

2. The method of claim 1 further characterized by providing an anvil having an embossment thereon and stamping the tear seam by directing the embossment into the fused or gelled layer partially through the depth thereof.

3. The method of claim 1 further characterized by providing an anvil having a rule die thereon and the stamping the tear seam by directing said rule die into the fused layer partially through the depth thereof.

4. The method of claim 1 further characterized by providing an anvil having a reaction surface thereon of a first predetermined area and including an embossment thereon extending outwardly of said first predetermined area and stamping the tear seam by directing the embossment into the fused layer until the reaction surface engages the fused layer to produce a reaction force on the anvil that determines the depth of penetration of the embossment.

5. The method of claim 1 further characterized by mounting an anvil on the open end of the mold and stamping the tear seam by directing the anvil into the fused layer partially through the depth thereof.

6. The method of claim 1 further characterized by the thermoplastic material being polyvinyl chloride.

7. The method of claim 3 further characterized by the thermoplastic material being polyvinyl chloride.

8. The method of claim 5 further characterized by providing an anvil having an embossment and a reaction surface with a predetermined area thereon and stamping the tear seam by directing said embossment into the fused layer partially through the depth thereof and wherein the first predetermined area is sized to produce a reaction force on the anvil to determine the depth of penetration of the embossment.

* * * * *